UNITED STATES PATENT OFFICE.

CLEMENT B. TOWER, OF HYDE PARK, MASSACHUSETTS.

ACID GELATINE.

SPECIFICATION forming part of Letters Patent No. 398,915, dated March 5, 1889.

Application filed June 14, 1888. Serial No. 277,097. (No specimens.)

*To all whom it may concern:*

Be it known that I, CLEMENT B. TOWER, a citizen of the United States, residing at Hyde Park, in the county of Norfolk and State of Massachusetts, have invented certain new and useful Improvements in Composition of Matter; and I do declare the following to be a full, clear, and exact description of the invention, such as will enable others skilled in the art to which it appertains to make and use the same.

My invention has relation to the preparation of gelatine for edible purposes, and more particularly with reference to its use for the preparation of jellies, puddings, and the like, and the object is to manufacture and put upon the market an acidulated gelatine ready for use in the household without the addition of lemon or lime juice or other acid; and to these ends the novelty consists in a new article of manufacture, consisting of gelatine combined with a suitable innocuous acid, as will be hereinafter more fully described, and pointed out in the claims.

It has been proposed to add lime-juice to gelatine, but the result is an unsightly, dark, and plastic compound which has no commercial value, and as such it differs from the compound herein described, in which a pure acid is added to gelatine, whereby a compound is produced, which, when dried, becomes frangible or brittle, and is clear or transparent in appearance.

In the preparation of my new form of gelatine I first dissolve one part of gelatine in about eight parts of water, and when thoroughly dissolved by the aid of a gentle heat, I then add about fifteen (15) per cent. of the crystals of citric or analogous innocuous acid and agitate until the whole is thoroughly mixed, and it may then be clarified, if found necessary. The solution is then run into pans and allowed to jellify. It is then cut into sheets, placed upon frames, and dried in the usual manner. After it is thoroughly dry it may be packed for the market, as it is in sheets; or, if preferred, it may be broken into flakes, granulated, ground, or shredded to facilitate its dissolving. With gelatine in this form a delicious lemon jelly can be prepared by simply dissolving the gelatine in a suitable amount of water and adding sugar and essence of lemon to suit the taste. Other dishes—such as pudding and the like—may be prepared in the same manner.

In a concurrent application, Serial No. 279,985, I have claimed an acidulated gelatine consisting of ordinary gelatine and a medicinal acid, such as phosphoric or the like.

What I claim is—

1. Acidulated gelatine in a dry and frangible or brittle form, consisting of ordinary gelatine and an edible vegetable acid, as set forth.

2. Acidulated gelatine in a dry and frangible or brittle form, consisting of ordinary gelatine and citric acid, as set forth.

In testimony whereof I affix my signature in presence of two witnesses.

CLEMENT B. TOWER.

Witnesses:
 HENRY J. ENNIS,
 J. MCNAMEE.